(12) United States Patent
Tang

(10) Patent No.: US 8,703,633 B2
(45) Date of Patent: Apr. 22, 2014

(54) ONE GLASS FIBER WITH HIGH STRENGTH AND HIGH MODULUS

(75) Inventor: Zhiyao Tang, Chongqing (CN)

(73) Assignee: Chongqing Polycomp Int'l Corporation, Chongqing (CN)

( * ) Notice: Subject to any disclaimer, the term of this patent is extended or adjusted under 35 U.S.C. 154(b) by 173 days.

(21) Appl. No.: 13/381,969

(22) PCT Filed: Jul. 2, 2010

(86) PCT No.: PCT/CN2010/000996
§ 371 (c)(1),
(2), (4) Date: Jan. 2, 2012

(87) PCT Pub. No.: WO2011/000221
PCT Pub. Date: Jan. 6, 2011

(65) Prior Publication Data
US 2012/0129678 A1    May 24, 2012

(30) Foreign Application Priority Data

Jul. 2, 2009  (CN) .......................... 2009 1 0104239

(51) Int. Cl.
*C03C 13/02* (2006.01)
*C03C 13/00* (2006.01)
*C03C 3/087* (2006.01)

(52) U.S. Cl.
USPC .................... 501/38; 501/35; 501/36; 501/70

(58) Field of Classification Search
USPC .......................................... 501/35, 36, 38, 70
See application file for complete search history.

(56) References Cited

U.S. PATENT DOCUMENTS

2008/0009403 A1 *  1/2008  Hofmann et al. ............... 501/55

FOREIGN PATENT DOCUMENTS

| CN | 1802327 A | 7/2006 |
| CN | 101597140 A | 12/2009 |
| GB | 1391384 A | * 11/1975 |
| WO | 2008142347 A2 | 11/2008 |

* cited by examiner

*Primary Examiner* — Karl Group
*Assistant Examiner* — Elizabeth A Bolden
(74) *Attorney, Agent, or Firm* — Morris Manning & Martin LLP; Tim Tingkang Xia, Esq.

(57) ABSTRACT

A high-intensity and high-modulus glass fiber is provided. Said fiber is produced by improving the processes, components and proportion of conventional E-glass production process and apparatus. The fiber contains 13% CaO at most, no boron and fluorine, meanwhile $ZrO_2$ and $Li_2O$ is first added, $B_2O_3$ is first removed, and $SO_3$ is added. The intensity and the modulus of the fiber are slightly lower than those of S-glass or T-glass, but obviously higher than those of E-glass and ECR-glass which are highly produced and widely used or other boron-free glass such as Advantex glass. Besides the intensity, modulus and fatigue resistance, said fiber has obvious advantages over E-glass in heat, acid and alkali resistance. The glass fiber roving made from said fiber has 22% higher tensile strength and 11~15.7% higher modulus than those of E-glass, and has 16% higher tensile strength and 5~6% higher modulus than those of ECR-glass.

1 Claim, No Drawings

ONE GLASS FIBER WITH HIGH STRENGTH AND HIGH MODULUS

FIELD OF TECHNOLOGY

The said invention is in the fields of the glass fiber materials, especially a glass fiber with high strength and high modulus that is appropriate for the enhancement type and spinning type.

BACKGROUND TECHNOLOGY

The typical high strength and high modulus glass fibers are almost all glass that belongs to the $SiO_2$—$Al_2O_3$—$MgO$ system, such as the S-2 glass from the U.S.A., the T glass from Japan and the S glass from China (for definition, introduction, technology and performance of relevant products such as E-glass, S glass, T glass, ECR-glass and S-2 glass, refer to the following documents: Collection of Glass Fiber Standards, the first edition of China Standards Publishing House in 2008, which was compiled by National Fiberglass Product Quality Supervision & Testing Center and National Technical Committee on Glass Fiber of Standardization Administration of China, and published by the fifth editorial room of China Standards Publishing House; *Application Technology of Glass Fiber*, the first edition of China Petro-Chemical Publishing House in 2004, which was written by Jiang Zhaozhong; *Glass Fiber and Mineral Wool Encyclopedia*, the first edition of Beijing Publishing House of Chemist Industry, which was written by Zhang Yaoming.)

Some glass fiber producers adds decent amount of other metallic oxides that help in founding to decrease the fiber-modeling temperature and improve the devitrification inclination, so that the high strength and high modulus nature is kept as well as the technology for the founding and fiber-modeling process is improved. However, with the difficulties high in production and the expenditures high in production cost, this glass fiber of the $SiO_2$—$Al_2O_3$—$MgO$ system is applied less in the universal composite material field, but more in the war industry, aviation, and high-end civil products.

INVENTION

The object of this invention is to obtain the technique and device for producing the well-known universal E-glass (refer to *The Study of Melt Flow in Glass Tanks with Bubbling Process and Its Application in E-glass Unit Melter* for the technique and device for producing the well-known universal E-glass; it was written by doctor Yang Zhiqiang under the guidance of Professor Guo Zengyuan, and published in the third volume of *Engineering Thermophysics* from Tsinghua University), and produce a new high strength and high modulus glass fiber by improving the technique, components and formulas. The high strength and high modulus glass fiber is produced in a generally similar way in production technology and devices with that of the E-glass. The so-said high strength and high modulus is relative, with the values somewhat lower than the S glass or T glass, but obviously higher than the E glass and the ECR-glass which are produced in great amount and used universally, or other boron-free glass such as Advantex glass. Apart from the strength modulus and fatigue resistance nature, this glass has other distinctive features over the E glass, such as heat resistance, acid resistance and alkali resistance nature.

The high strength and high modulus glass fiber in the Invention includes the components with contents in weight percentage as follows:

| Chemical components | Weight percentage |
|---|---|
| $SiO_2$ | 56-64 |
| $Al_2O_3$ | 13-20 |
| CaO | 8-13 |
| MgO | 7-12 |
| $TiO_2$ | 0-2.5 |
| $ZrO_2$ | 0-2.0 |
| $Li_2O$ | 0-0.8 |
| $Na_2O + K_2O$ | 0-1.0 |
| $Fe_2O_3$ | 0-0.60 |
| $F_2$ | 0-0.60 |

The high strength and high modulus glass fiber in the Invention includes the components with contents in weight percentage preferably as follows:

| Chemical components | Weight percentage |
|---|---|
| $SiO_2$ | 58-62 |
| $Al_2O_3$ | 14-18 |
| CaO | 10-13 |
| MgO | 8-10 |
| $TiO_2$ | 0-2.5 |
| $ZrO_2$ | 0-2.0 |
| $Li_2O$ | 0-0.8 |
| $Na_2O + K_2O$ | 0.2-0.85 |
| $Li_2O + Na_2O + K_2O$ | <1.2 |
| $Fe_2O_3$ | 0-0.5 |
| $F_2$ | 0-0.6 |

In the above high strength and high modulus glass fiber, the content of F2 in weight percentage is preferably 0.00-0.005.

The high strength and high modulus glass fiber in the Invention includes the components with contents in weight percentage preferably as follows:

| Chemical components | Weight percentage |
|---|---|
| $SiO_2$ | 58-62 |
| $Al_2O_3$ | 14-18 |
| CaO | 10-13 |
| MgO | 8-10 |
| $TiO_2$ | 0.8-2.0 |
| $ZrO_2$ | 0-2.0 |
| $Li_2O$ | 0-0.8 |
| $Na_2O + K_2O$ | 0.2-0.85 |
| $Li_2O + Na_2O + K_2O$ | <1.0 |
| $Fe_2O_3$ | 0-0.50 |

In the above high strength and high modulus glass fiber, the more preferable components with more preferable weight percentage as follows: $SiO_2$ in the percent of 60.6 by weight, CaO in the percent of 12.3 by weight, $TiO_2$ in the percent of 1.2 by weight, $Li_2O$ in the percent of 0.40 by weight, $Na_2O+K_2O$ in the percent of 0.40 by weight, $Fe_2O_3$ in the percent of 0.35 by weight, $Al_2O_3$ in the percent of 15.8 by weight and MgO in the percent of 8.8 by weight. In addition, an appropriate amount of $SO_3$ is added, and it is in the preferable percent of 0.02 in the high strength and high modulus glass fiber. In the proportion structure of the components with specific contents, a difference of at least 80° C. is formed between the temperature for shaping the glass fiber (when the viscosity of the glass is 1000 poise) and the liquid temperature of glass. With the components, proportion and technique, the products has the best performance.

Specifically, the glass of the invention is provided with the $SiO_2$—$Al_2O_3$—MgO—CaO system which has the components as follows:

| Chemical components | Weight percentage |
| --- | --- |
| $SiO_2$ | 56-64 |
| $Al_2O_3$ | 13-20 |
| CaO | 8-13 |
| MgO | 7-12 |
| $TiO_2$ | 0-2.5 |
| $ZrO_2$ | 0-2.0 |
| $Li_2O$ | 0-0.8 |
| $Na_2O + K_2O$ | <1.0 |
| $Fe_2O_3$ | <0.6 |
| $F_2$ | 0-0.60 |

$F_2$ in the more optimized glass components, can be directly removed or made with content of 0.0-0.005%.

| Chemical components | Weight percentage |
| --- | --- |
| $SiO_2$ | 58-62 |
| $Al_2O_3$ | 14-18 |
| CaO | 10-13 |
| MgO | 8-10 |
| $TiO_2$ | 0.8-2.0 |
| $ZrO_2$ | 0-2.0 |
| $Li_2O$ | 0-0.8 |
| $Na_2O + K_2O$ | 0.2-0.85 |
| $Li_2O + Na_2O + K_2O$ | <1.2 |
| $Fe_2O_3$ | <0.50 |

In the above Scheme, whenever the saying that there are basically no $F_2$ in the glass is referred to, it means $CaF_2$ is not added in the glass batch. The existent $F_2$ is only brought in by other raw materials as impurities with content generally of 0.0-0.005%.

The invention provides a high strength and high modulus glass fiber of the $SiO_2$—$Al_2O_3$—MgO—CaO system. The strength of the glass fiber is strongly related to the components (structures), as well as monofilament diameter, while the flexible modulus seems to be only related to the chemical components (structures). R-glass also has a high strength and high modulus glass fiber of the $SiO_2$—$Al_2O_3$—MgO—CaO system, however, as the content of $Al_2O_3$ is almost as high in the components as the S glass, the founding and fiber-modeling temperature is so high that few commercial applications is established against high production cost.

A certain amount of CaO is brought in on the basis of the traditional $SiO_2$—$Al_2O_3$—MgO ternary system glass to make it a $SiO_2$—$Al_2O_3$—MgO—CaO quaternary system glass, so that the founding and fiber-modeling temperature is decreased. Apart from that, the invention has also added some other metallic oxide in the $SiO_2$—$Al_2O_3$—MgO—CaO system glass to improve the technology in glass founding and fiber-modeling, improve the modulus, strength and chemistry corrosion resistance of the glass, or improve a certain application nature of the glass fiber composite materials.

The network bone structure of the glass is made up of $SiO_2$. In the traditional high strength S system glass, the content of the $SiO_2$ will take a percentage of about 65%. In the optimized formula in the invention, the content of the $SiO_2$ has a range of 58-62%. If the content of $SiO_2$ is over 62%, the glass founding and fiber-modeling temperature rises distinctively with an increased viscosity of the glass.

The contents of $Al_2O_3$+CaO+MgO+$TiO_2$, which do not belong to the glass network, are high in this high strength and high modulus glass in the invention. If the content of $SiO_2$ is lower than 56%, the strength and modulus of the glass fiber is decreased, as well as the devitrification inclination of the glass is increased.

$Al_2O_3$ is a very interesting component in the glass. According to the glass structure theory, a certain amount of $Al_2O_3$ could enter the network structure of the glass in the form of $[AlO_4]$ tetrahedral. If the content is too much, part of the $Al^{3+}$ would form a $[AlO_6]$ coordination structure and could not enter the network structure of the glass. As a result, a high $Al_2O_3$ content will distinctively increase the viscosity and surface tension of the glass and the devitrification temperature of the glass, to increase the difficulty in glass founding and fiber-modeling. As the network structure of the glass, the total content of $SiO_2$+$Al_2O_3$ plays a significant role in the strength and modulus of the glass fiber. The total content of the $SiO_2$+$Al_2O_3$ in the typical S, T and R glass are all between 83-90%. The content of the $Al_2O_3$ is 12-20% in the invention, and 14-18% in the optimized formula, with a total content of $SiO_2$+$Al_2O_3$ between 72-80%. If the total content of $SiO_2$+$Al_2O_3$ is over 80%, it is difficult to apply the traditional glass tank furnace technology on production.

Even though MgO and CaO do not belong to the network in the glass structure and help decrease the viscosity of the glass in the high temperature, they play different roles in the glass. With higher Mg-O single bond strength than Ca—O, MgO plays a significant role in increasing the strength and modulus of the glass, even though the crystallization inclination is distinctively increased with a high MgO content. The content of MgO in the optimized formula of the invention is between 8-10%. While the introduction of CaO is effective in decreasing the high heat viscosity of the molten mass and improving the crystallization inclination of the glass, an excess of amount would decrease the strength and modulus. The content of CaO in the optimized formula of the invention is between 10-13%.

According to scientific experiments, the inventor applying for the patent discover that: as a component that does not belong to the network structure of the glass, $TiO_2$ helps decrease the high heat viscosity of the molten mass. With the highest Ti—O single bond strength among the ion components that do not belong to the network, the introduction of $TiO_2$ helps to improve the modulus of the glass fiber as well as the chemistry corrosion resistance (especially acid resistance). The existence of $TiO_2$, however, plays a negative part in the color of the glass. As the amount increases, the glass would present a gradual claybank look, as well as an increased crystallization inclination and batch cost. The content of $TiO_2$ is 0-2.5% in the invention, and 0.8-2.0% in the optimal combination.

The introduction of $ZrO_2$ also helps increase the modulus of the glass fiber. The fact that $ZrO_2$ helps improve the alkali resistance and water resistance of the glass fiber is a key nature in applying its composite material sections in strengthening the concrete. The content of $ZrO_2$ is 0-2.0% for the glass in the invention.

As a alkalis metallic oxide, $Li_2O$ is seldom used as an effective component of the glass with high prices while $Na_2O$ and $K_2O$ are used in industrial glass more often. Even though $Li_2O$ helps more in founding and decreasing the high heat viscosity than $Na_2O$ and $K_2O$, it is too expensive in raw materials to be applied practically. If the total content of the alkalis metallic oxide is fixed in the glass components, a certain replacement of $Na_2O$ and $K_2O$ with $Li_2O$ would take distinctive effect in improving the glass founding and fiber modeling. The content of Li2O is 0-0.8% in the glass components.

The introduction of $Na_2O$ and $K_2O$ is necessary (part of $Na_2O$ and $K_2O$ in the glass components are always brought in from other raw mineral materials). Alkalis metallic oxides help decrease high heat viscosity and improve crystallization inclination with a maximum introduction limit. The amount of $Na_2O$+$K_2O$ recommended in the invention is less than 0.85%, with a more optimal scheme of the total content of $Li_2O+Na_2O+K_2O$ less than 1.0%. The total content of $Na_2O+K_2O$ is 0.8% in one optimal scheme of the invention, while the total content of $Li_2O+Na_2O+K_2O$ is 0.8% in another practical scheme with a 0.41% $Li_2O$ content.

The existence of $Fe_2O_3$ in the glass affects the color of the glass and the transmission efficiency of the heat in the tank furnace. The diathermancy is affected more for those glasses with a certain amount of $TiO_2$. The content of $Fe_2O_3$ recommended in the scheme is 0-0.5%.

$B_2O_3$ could help decrease the melting temperature and viscosity effectively, and the content of it is 4.0-8.5% in E glass. However, $B_2O_3$ takes a negative effect on the strength and modulus of the glass fiber as well as the acid and alkali resistance of the glass. There is no $B_2O_3$ in the glass components of the invention.

As a flux that is applied most universally and effectively in the glass production, $F_2$ could decrease the surface tensile of the glass molten mass effectively. The traditional E glass has $F_2$ too. As an air pollutant, the content of $F_2$ in one of the glass formula is 0.6%. The fact that optimal glass in the invention do not contain $F_2$, and that $CaF_2$ is not added specially in the batch does not necessarily mean $F_2$ is not contained in the glass. $F_2$ could also be of ppm grade brought in by other raw mineral materials as impurities. The goal for not including $B_2O_3$ and $F_2$ in the glass of the invention is to obtain an environment friendly, high strength, high modulus glass fiber with excellent performance, as well as an easy production process from glass founding and fiber modeling.

In the traditional production control for E glass fibers, the role that $SO_3$ plays is very interesting. $SO_3$ is very crucial for the clearance (bubbles in glass) in E glass, and $SO_3/C$ is always an important regulation measure. $SO_3/C$ serves as a measure instead of an indicator, and the redox of the glass is more effective in presenting the founding and clearing effect of the glass melt. The rodex requested in different glass formula and their corresponding best clearance effect are not completely the same, and the rodex between the glass in the invention and the E glass is also different.

In the process of producing the glass fibers, $Fe_2O_3$ is not considered as the main components but even as a harmful part which will not be added specially. Generally, $Fe_2O_3$ is contained in the other raw mineral materials and brought in with amount under strict control. According provisions in the patent, the content of $Fe_2O_3$ is 0-0.6%. Compared with the prior art, it is stricter to specify the contents of $Fe_2O_3$ in the raw materials, and the low amount of $Fe_2O_3$ is more convenient to fusing and performance of the glass fibers.

The glass fiber is a composition with multi-components, and it is a quite special glass. It is quite important to balance the contents of the components. Slight variance on the content of the same component may cause a great change on the performance of the glass fibers, and the content of the same component is added or decreased to result in huge difference of the performances of the products. So a mass of exploratory experiments and detecting analysis are made to obtain a glass fiber formula that achieves high performance, complies with application requirements and is suitable for industrialized production.

The components and the proportion scheme of the patent are achievements in scientific research obtained by the inventor thereof through a large number of intellectual efforts on the basis of lots of experiments and tests according to the requirements of the performance and actual experiences in production. Enormous difference occurs between the performances of the patent and the prior art. The patent is an important innovation in science and technology with outstanding material characteristics and improvements.

Compared with the prior art, the invention is also provided with some innovative characteristics as follows:

(1) In the Invention, the Maximum Content of CaO is 13%

In the invention, CaO accounts for 10-13% of high strength and high modulus glass fibers while beyond 13% in the prior art. According to the scientific experiments and tests, the inventor discovers that CaO accounts for more than 13% while MgO accounts for 8-10%. It may benefit for fusing and shaping the glass fibers, but strength and modulus of the glass fibers will be reduced as frangibility of the glass is increased. If CaO accounts for lower than 10%, viscosity of the glass liquid at high temperature will be so high that it is hard for lampworking of glasses. Therefore, in the invention, the content of CaO is determined as 10-13%.

(2) $ZrO_2$ is Introduced in the Invention

As the invention mainly applied to the blades of fans for wind power generation requires for not only high strength and high modulus but also alkali resistance and water resistance, 0-2% of $ZrO_2$ is exclusively added in the glass fiber formula with high strength and high modulus in the invention. $ZrO_2$ with the usage benefits for improving the modulus of high strength glass fibers, and more importantly improving alkali resistance and water resistance of the glass fiber to play an important role in the blades of the fans for wind power generation and contribute to prolonging service life thereof in a bad condition. If the content of $ZrO_2$ is beyond 2%, the viscosity of the glass will be obviously raised and lampworking of the glass will be under the effect.

(3) Elements B and F are not Contained in the Invention

Elements B and F are the basic components of the traditional E glass, and they are so quite available to reducing the temperature for fusing the glass as well as tension and viscosity of the surface of glass liquid that the difficulty coefficient for production of the glass fibers can be reduced. However, the elements B and F will cause negative effects on the strength, the elastic modulus, the alkali resistance and the water resistance of the glass fibers after being introduced into the glass fibers. Moreover, the elements B and F are so volatile that equipment will be corroded and air will be under bad pollution. In the invention, the elements B and F are not applied to the glass fiber formula, according with the national requirements for environmental protection and contributing to improving the strength and the corrosion resistance of the glass fibers.

(4) $Li_2O$ is Introduced in the Invention

Elements Ti and Zr instead of B and F are added in the formula of the invention to promote the modulus and the chemical stability. 0-0.8% of $Li_2O$ is correspondingly added in the formula in order to improve the performance of the glass fiber, contributing to fusing the glass at a high temperature, reducing the viscosity of the glass liquid and improving the chemical stability of the glass. In the aspect of cost, $Li_2O$ can be extracted from natural minerals and used a little although it is expensive. Borocalcite used in domestic, however, has higher cost as it must be imported from other countries.

(5) Change on Performance and Usage of Modulus Fiber Product

The objective of the invention is to design a glass fiber mainly applied to the blades of the fan for wind power generation. It has high strength, high modulus and good alkali resistance and water assistance. With quite good operability, the invention has entered a large-scale production stage. According to comparison, the most similar document-patent application No. CN1802327A which is discovered by an examiner of China Patent Bureau, is mainly applied to the glass fibers in the aviation field and puts emphasis on high Young's modulus. The invention and the patent application No. CN1802327A are completely different in objectives, application fields and design thoughts of formula. According to data from the two descriptions of the patent inventions, the tensile strength of the glass fibers in the invention is 22% greater than that of the traditional E glass and modulus thereof is 11-15.7% greater than that of the traditional E glass, while the modulus of the glass fiber in the patent No. CN1802327A is only 8.5% greater than that of E glass. In the aspect of detection for the stability of the glass fiber, acid resistance, alkali resistance and water assistance of the invention are obvious better than those of the patent application No. CN1802327A.

(6) Difference of Test Data About Weight Loss Parameter

According to the reports for testing stability of the glass fibers in the invention and the patent No. CN1802327A, enormous differences occur to the weight loss parameters of the two in the following table:

Difference of Test Data

| Name of sample | Weight loss percentage (50° C., 24 h) | | |
|---|---|---|---|
| | Distilled water | 0.5 mol/L H2SO4 Solution | 0.1 mol/L NaOH Solution |
| Embodiment No. 5 of CN1802327A | 0.39 | 3.28 | 2.04 |
| Embodiment No. 9 of the invention | 0.24 | 0.86 | 1.43 |

(7) Addition of $SO_3$

In the production of glass fibers, the small dosage of $SO_3$ plays an important role in regulation of atmosphere in tank furnace. $SO_3$ is very crucial for the clearance (bubbles in glass) in E glass, and $SO_3/C$ is always an important regulation measure. $SO_3/C$ serves as a measure instead of an indicator, and the redox of the glass is more effective in presenting the founding and clearing effect of the glass melt. The redox requested in different glass formula and their corresponding best clearance effect are not completely the same, and the redox between the glass in the invention and the E glass is also different.

With the repeated experiments, decent amount of $SO_3$ is added to the invention.

(8) Removal of $B_2O_3$ $B_2O_3$ could help decrease the melting temperature and viscosity effectively, and the content thereof in the existing technology is 4.0-8.5% in E glass. However, $B_2O_3$ takes a negative effect on the strength and modulus of the glass fiber as well as the acid and alkali resistance of the glass. There is no $B_2O_3$ in the glass components of the invention.

In conclusion, the patent application compared with the existing technology has obvious differences in the aspects such as object of invention, field of application, design of formula, performance of glass fiber, and actual machinability of glass fiber. Such a creative work achievement made on the basis of massive experiments and explorations, tests and analyses, as well as practices and verifications is featured with novelty and creativeness required in patent law.

SPECIFIC APPLICATIONS

A practical glass components founding experiment is carried out and illustrated as follows to present the invention, in the glass components form.

While in founding glass in the laboratory with electrical heating furnaces, the raw materials used are all raw mineral materials commonly used by the glass fiber factory, with the exception of $TiO_2$ and $Na_2O$ as industrial chemicals. The introduction of main components such as $SiO_2$, $Al_2O_3$, CaO, and MgO is through the raw materials of quartz sand, pyrauxite or kaolin, limestone and magnesite respectively. $Li_2O$ and $ZrO_2$ are also introduced through raw mineral materials. This material selection scheme of the experiment is more close to the realistic glass fiber production condition. The batch of all components are put in one molybdenum rhodium alloy crucible and melted into glass in the electrical heating furnace. A comparison on the differences in melting time and temperature could easily observe the difficulty level on the founding and clearing for the glass in each formula, and test each glass on the softening point, crystallization temperature and fiber modeling temperature ($T_{log\ \eta}$=3).

The glass fragments founded in the lab are put in the crucible made solely of molybdenum and rhodium (with 10 discharge spouts at the bottom), and are heated for 2 hours with a temperature 60-100° C. higher than its modeling temperature, then decrease the temperature of the crucible to about 10° C. above its modeling temperature to carry out the stringing test. Adjust the temperature of the crucible properly to acquire the best stringing state for the glass fiber.

Components of the Glass

| | N01# | N02# | N03# | N04# | N05# | N06# | N07# | N08# | N09# | N010# | N011# | N012# |
|---|---|---|---|---|---|---|---|---|---|---|---|---|
| $SiO_2$ | 60.5 | 60.72 | 60.7 | 60.7 | 59.5 | 60.6 | 60.5 | 61.0 | 60.0 | 60.0 | 58.5 | 60.5 |
| $Al_2O_3$ | 15.6 | 15.80 | 16.0 | 16.2 | 17.0 | 15.5 | 16.0 | 16.0 | 15.8 | 15.8 | 18.0 | 15.8 |
| CaO | 12.7 | 12.05 | 12.8 | 12.6 | 10.5 | 12.2 | 12.5 | 11.8 | 12.2 | 12.2 | 13.5 | 12.3 |
| MgO | 8.6 | 8.98 | 8.8 | 8.8 | 9.3 | 8.6 | 8.5 | 9.2 | 8.8 | 8.8 | 8.5 | 8.5 |
| $Li_2O$ | / | 0.40 | / | 0.45 | 0.45 | / | / | 0.50 | 0.40 | / | 0.45 | / |
| $Na_2 + K_2O$ | 0.8 | 0.36 | 0.85 | 0.40 | 0.40 | 0.80 | 0.85 | 0.35 | 0.45 | 0.85 | 0.40 | 0.80 |
| $TiO_2$ | 1.3 | 1.20 | 0.30 | 0.25 | 1.2 | 1.2 | 0.25 | 0.30 | 1.2 | 1.2 | 0.30 | 0.3 |
| $ZrO_2$ | | | | | | | 1.0 | | 0.8 | 0.8 | / | 1.5 |
| $Fe_2O_3$ | 0.32 | 0.32 | 0.32 | 0.32 | 0.32 | 0.32 | 0.32 | 0.32 | 0.30 | 0.30 | 0.30 | 0.30 |
| $F_2$ | | | | | | 0.6 | | 0.50 | | | | / |
| T soft (° C.) | 914 | 894 | 927 | 892 | 900 | 898 | 921 | 879 | 895 | 914 | 890 | 923 |
| T liquid (° C.) | 1221 | 1200 | 1191 | 1208 | 1202 | 1207 | 1192 | 1223 | 1178 | 1197 | 1240 | 1234 |
| Tlog η = 3 (° C.) | 1298 | 1282 | 1293 | 1282 | 1288 | 1287 | 1296 | 1273 | 1268 | 1271 | 1269 | 1300 |
| δT(° C.) | 77 | 82 | 102 | 74 | 86 | 80 | 104 | 50 | 90 | 74 | 29 | 66 |

To further verify the invention, a production experiment is carried out on one small size glass fiber tank furnace on the glass with the components. Zero twist roving with the monofilament diameter of 13 μm, 17 μm and 24 μm is produced in trial with the components of the application glass as follows:

$SiO_2$ 60.58%; $Al_2O_3$ 15.88%; CaO 12.32%; MgO 8.77%; $Li_2O$ 0.41%; $Na_2O+K_2O$ 0.39%; $TiO_2$ 1.2%; $Fe_2O_3$ 0.35%; $SO_3$ 0.02%. The softening point of the glass is 896° C., the log 3 temperature is 1276° C., the glass liquidus temperature is 1194° C., and the δT is 82° C.

The mechanical property of the direct zero twist roving obtained against the ASTM D 2343 standard is as follows:

|  | 2400tex direct roving | | | 1200tex direct roving | | |
| --- | --- | --- | --- | --- | --- | --- |
|  | Fiber Diameter/ Resin | Tensile Strength MP | Tensile Modulus Gpa | Fiber Diameter/ Resin | Tensile Strength MP | Tensile Modulus Gpa |
| E glass fiber | 24 μmEP | 2069 | 81.9 | 17 μm/EP | 2077 | 81.9 |
| ECR glass fiber | 24 μm/EP | 2300 | 86.7 | 17 μm/EP | 2180 | 85.8 |
| glass fiber of this invention | 24 μm/EP | 2678 | 91.0 | 17 μm/EP | 2546 | 94.8 |

Even though an only apparent mechanical property of the fiber glass roving I resin is obtained from the mechanical tensile test, all the testing results of the above glass fibers show the comparing tendency of the tensile strength and modulus for all kinds of glass fibers. A series of test proves that the roving of this glass fiber has a tensile strength 22% higher and a modulus 11-15.7% higher than the E glass, and a tensile strength 16% higher and a modulus 5-6% higher than the ECR glass.

The invention claimed is:

1. One glass fiber with high strength and high modulus, with the specified components and weight percentage as follows:

| | |
| --- | --- |
| $SiO_2$ | 58-62; |
| $Al_2O_3$ | 14-18; |
| CaO | ≥8 and <9; |
| MgO | >10 and ≤12; |
| $TiO_2$ | 1.2; |
| $ZrO_2$ | 0.8; |
| $Li_2O$ | 0.40; |
| $Na_2O + K_2O$ | 0.45; |
| $Fe_2O_3$ | 0.30; |
| $F_2$ | 0. |

* * * * *